United States Patent [19]

Armitage

[11] Patent Number: 5,226,322
[45] Date of Patent: Jul. 13, 1993

[54] INTERNAL COMBUSTION ENGINE MISFIRE DETECTOR

[75] Inventor: Keith D. Armitage, Canton Township, Wayne County, Mich.

[73] Assignee: General Motors Corporation, Detroit, Mich.

[21] Appl. No.: 809,713

[22] Filed: Dec. 18, 1991

[51] Int. Cl.$^5$ .................................... G01M 15/00
[52] U.S. Cl. .................................... 73/116
[58] Field of Search ............... 73/116, 117.3, 35; 364/431.08; 123/419, 436; 340/439

[56] References Cited

U.S. PATENT DOCUMENTS

| | | | |
|---|---|---|---|
| 4,189,171 | 2/1980 | Morita | 364/431.08 |
| 4,268,910 | 5/1981 | Omori et al. | 364/431.08 |
| 4,420,967 | 12/1983 | Enushima et al. | 73/35 |
| 4,691,286 | 9/1987 | Obayashi et al. | 364/431.08 |

Primary Examiner—Robert Raevis
Attorney, Agent, or Firm—Creighton R. Meland

[57] ABSTRACT

A method of detecting a misfire condition in a spark ignited internal combustion engine where the idle speed of the engine is controlled by an idle speed control means which controls engine idle speed by varying the spark timing advance for the engine ignition system. With the engine running at idle speed, the instantaneous spark timing advance being developed is repeatedly sampled for a predetermined number of consecutively occurring data samples. The absolute difference in sampled spark timing advance values between each pair of data samples is calculated for all of the predetermined number of data samples. The absolute differences in spark timing values that occur between data samples are added together to provide a sum total. If the sum total exceeds a reference value, the engine is operating in a misfire condition.

5 Claims, 3 Drawing Sheets

| SAMPLED SPARK TIMING ADVANCE VALUES | ABSOLUTE DIFFERENCE |
|---|---|
| 20, 22 | 2 |
| 22, 14 | 8 |
| 14, 30 | 16 |
| 30, 20 | 10 |
| 20, 26 | 6 |
| 26, 30 | 4 |
| 30, 12 | 18 |
| 12, 15 | 3 |
| 15, 18 | 3 |

FIG. 4

INTERNAL COMBUSTION ENGINE MISFIRE DETECTOR

This invention relates to detecting a misfire condition in a spark ignited internal combustion engine.

Internal combustion engines are frequently equipped with an electronic idle speed control which operates to maintain engine idle speed at a predetermined desired value. Such idle speed control systems control the position of an idle air bypass valve as a function of engine speed. Further, in some idle speed control systems, for example, the idle speed control system used on the 2.3L QUAD 4 engine manufactured by General Motors Corporation, spark timing advance is also varied to control engine idle speed. Thus, in the idle speed control system used on the QUAD 4 engine, spark timing advance is increased when engine speed is lower than the predetermined idle speed and is decreased when engine speed is higher than the predetermined engine idle speed. Putting it another way, when engine idle speed is higher than it should be, spark timing is retarded and when engine speed is lower than it should be, spark timing is advanced.

It has been discovered that when an engine is operating in an idling mode, the changes in spark advance that are produced by the idle speed control system as a result of engine misfiring can be used as an indication of engine misfire. More specifically, it has been discovered that engine misfire can be detected by operating the engine at idle speed and then consecutively sampling and recording consecutively occurring spark timing advance values. The absolute difference between consecutively occurring sampled spark timing values are calculated and consecutively occurring absolute difference values so calculated are added or summed to provide an absolute test sum. This absolute test sum derived from sampling a number of consecutively occurring spark timing values is then compared against a known acceptable sum value. The known acceptable sum is determined by obtaining data as described above from an engine that is known not to be misfiring.

IN THE DRAWINGS

FIG. 4 is a chart that is useful in explaining the misfire detection method of this invention.

Figure 1:
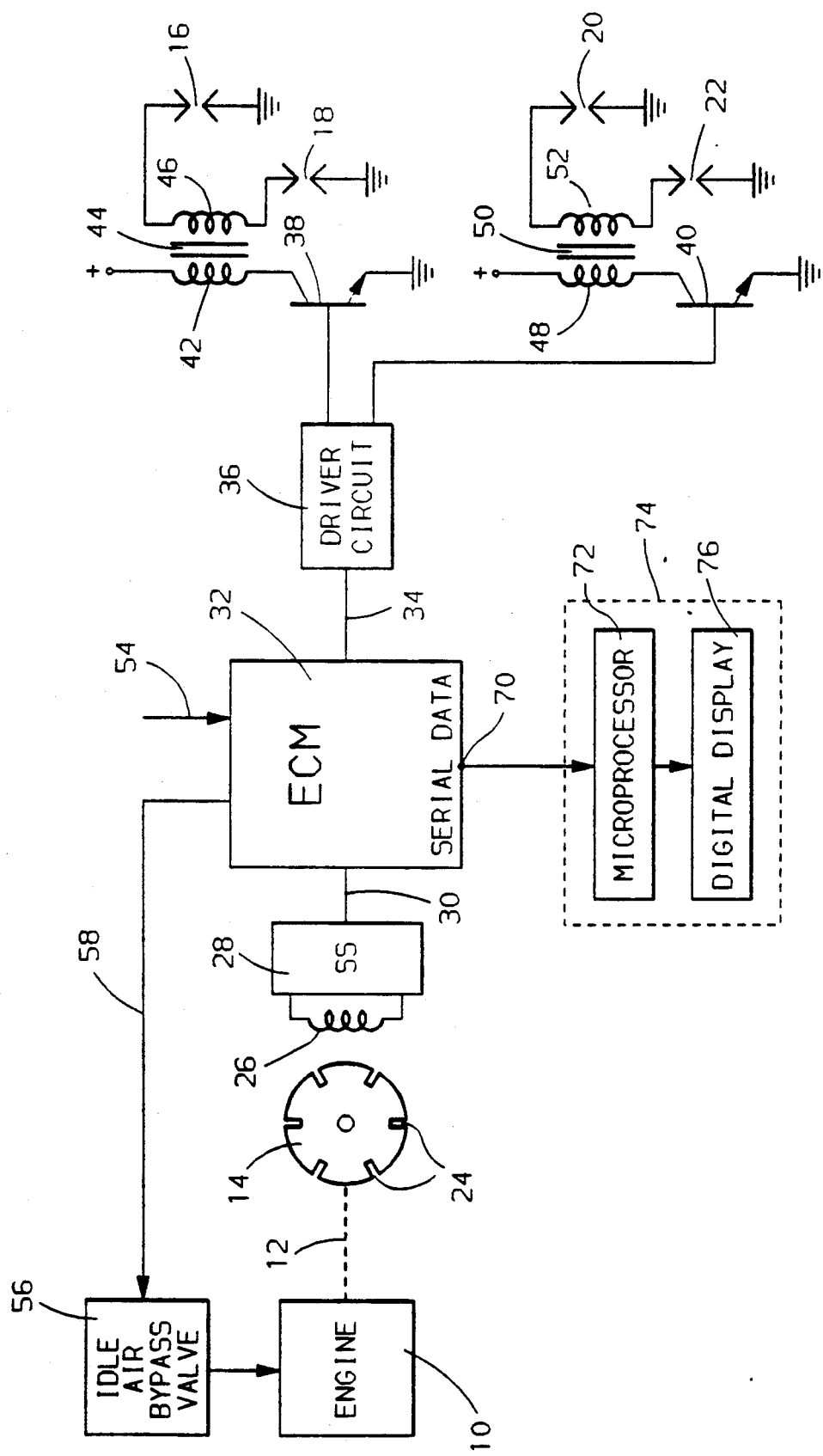
FIG. 1 illustrates an electronic control system for a spark ignited internal combustion engine.

Referring now to the drawings, and more particularly to FIG. 1, an electronic engine control system is illustrated. In FIG. 1 a spark ignited internal combustion engine 10 has a crankshaft 12 which drives a wheel 14. It will be assumed that engine 10 is a four-cylinder engine and may be a QUAD 4 engine. The four spark plugs for engine 10 are designated respectively as 16, 18, 20, and 22. The ignition system for engine 10 is so-called distributorless ignition system, that is, two spark plugs are fired by one ignition coil.

The wheel 14 has six slots 24 that are equally spaced by sixty degrees. The wheel has a seventh slot (not illustrated) that is located at ten angular degrees from one of the slots 24 which develops a synchronizing signal for the distributorless ignition system in a manner known to those skilled in the art. The wheel is associated with a variable reluctance pick-up that includes a pick-up coil 26. As a slot passes by the pick-up, a voltage is induced in coil 26. Pick-up coil 26 is connected to a signal shaping circuit 28 that has an output connected to line 30. Circuit 28 develops a series of square-wave pulses that are applied to line 30 in a manner known to those skilled in the art.

The line 30 is connected to an input of an electronic control module 32 hereafter referred to as an ECM. The ECM is a programmed microprocessor and may be of the type of ECM utilized to control a QUAD 4 engine. The frequency of the square wave pulses on line 30 varies with changes in engine speed and the ECM therefore obtains engine speed information from these pulses. Further, the pulses on line 30 provide the ECM with crankshaft position information.

One of the outputs of ECM 32 is connected to a line 34 and this line is connected to transistor driver circuit 36. The outputs of circuit 36 are connected respectively to the base electrodes of NPN transistors 38 and 40.

The collector and emitter of transistor 38 are connected in series with the primary winding 42 of an ignition coil 44. The secondary winding 46 of coil 44 is connected to spark plugs 16 and 18. In a similar fashion, the collector and emitter of transistor 40 are connected in series with the primary winding 48 of ignition coil 50. The secondary winding 52 of coil 50 is connected to spark plugs 20 and 22. One side of each primary winding is connected to the positive terminal of the motor vehicle twelve volt battery.

As is well known to those skilled in the art, in a distributorless ignition system, only one of the two ignition coils is enabled at a time. Assuming coil 44 is the one to be enabled, transistor 38 is turned on to begin a dwell period and current flows through and builds-up in primary winding 42. When transistor 38 is turned off, a large voltage is induced in secondary winding 46 which causes spark plugs 16 and 18 to fire. The same type of operation holds true for transistor 40 and coil 50.

The point at which transistor 38 or 40 is turned off to cause a spark plug firing voltage to be developed is controlled relative to the top dead center position of a piston of the engine. This position of the piston relative to top dead center at the instant of spark plug firing is known as spark timing advance. In the further description of this invention, spark timing advance means the number of degrees prior to top dead center that a spark plug should fire.

Spark advance timing in the system of FIG. 1 is calculated by ECM 32. The ECM computes spark timing advance in response to engine speed and to other engine operating parameters such as manifold pressure which are applied to the ECM via input line 54. Further, as will be described in more detail hereafter, the spark timing advance is varied by the idle speed control system when the engine is being operated in the idle speed control mode. The output of ECM 32 on line 34 controls the turning off of transistors 38 and 40 at the calculated spark timing advance point.

When the engine is operating in the idle speed mode, the ECM 32 controls the position of an idle air bypass valve 56 that, in turn, controls the amount of idle air supplied to engine 10. The electrically operated valve 56 is connected to ECM 32 by line 58 and the position of the valve 56 is controlled as a function of engine speed in a manner well known to those skilled in the art.

Figure 2:
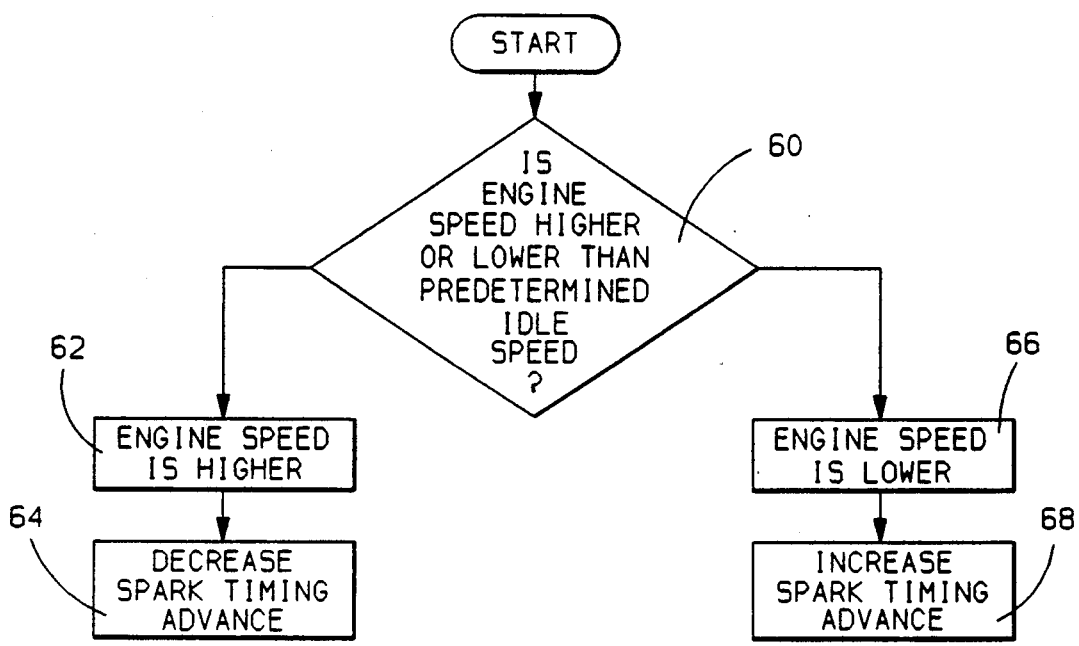
FIG. 2 is a flow diagram illustrating an idle speed control algorithm that varies spark timing to control engine idle speed.

In addition to the idle air bypass type of idle speed control, it has been pointed out that some engine idle speed controls vary spark timing advance to control engine idle speed. FIG. 2 illustrates a control algorithm that is utilized by ECM 32 to control spark timing advance to thereby control engine idle speed by varying spark advance values. In step 60, the ECM determines whether engine speed is higher or lower than a predetermined idle speed. Predetermined idle speed means that the speed that is to be maintained by the idle speed control. If engine speed is higher as indicated by step 62, the spark timing advance developed by ECM 32 is decreased as indicated by block or step 64. A decrease in spark timing advance means that, in effect, spark timing is being relatively retarded which tends to slow down or decrease the engine speed.

If engine speed is lower than the predetermined idle speed as indicated by block or step 66, the spark timing advance is increased as indicated by block or step 68. An increase in spark timing advance means, in effect, that spark timing is being relatively advanced which tends to speed up or increase the engine speed.

In summary, it can be appreciated that the idle speed control that has been described varies spark timing advance as a function of engine speed to aid in maintaining the proper predetermined idle speed.

It has been discovered that when a spark ignited internal combustion engine has its idle speed controlled by an idle speed control that varies spark timing advance as a function of engine speed, that engine misfire can be detected by the changes that occur in spark timing advance values that occur when an engine is misfiring as compared to changes in spark timing advance values that occur when an engine is not misfiring. With this in mind, the method and manner in which misfire is detected will now be described.

The ECM 32 has a serial data output terminal 70 which periodically develops bytes of digital information that represent spark timing advance values computed by ECM 32. Terminal 70 is connected to a microprocessor 72 of a diagnostic scan device 74. Device 74 further includes a digital display 76 that is connected to an output of microprocessor 72. The device 74 can be powered by a lead wire that is connected to the cigarette lighter outlet on a motor vehicle.

Figure 3:
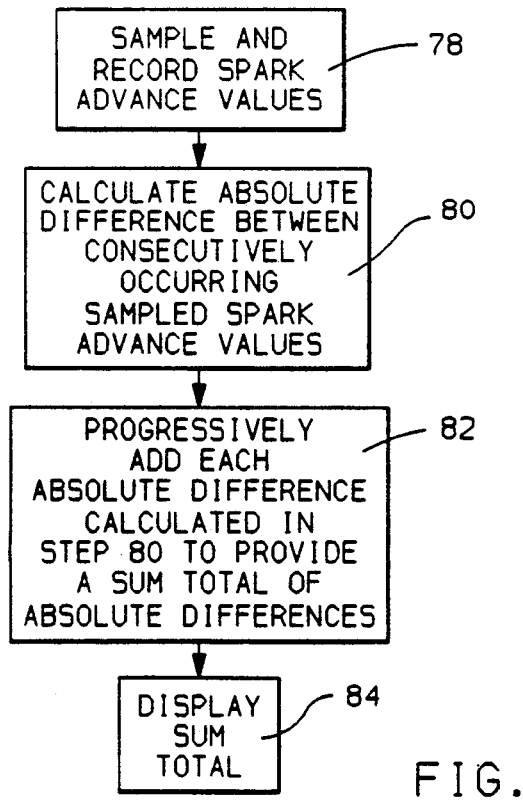
FIG. 3 is a flow diagram of an algorithm used in this invention to detect engine misfire.

The microprocessor 72 is programmed to execute the steps shown in FIG. 3.

Assume now that the engine is operating in the idle speed mode and that idle speed is being controlled by varying spark advance values as shown in FIG. 2. In the first step 78 shown in FIG. 3, a spark advance value from serial data terminal 70 is sampled and recorded. The sampling rate may be every 30–100 milliseconds. FIG. 4 is a chart which helps in explaining the steps to be further described in connection with FIG. 3. The left column of FIG. 4 specifies consecutively sampled spark timing advance values which are in terms of degrees of spark advance. The right column in FIG. 4 illustrates the absolute difference between consecutively occurring spark timing values set forth in the left column. Referring now to FIG. 3 and correlating it with the chart of FIG. 4, in the first step 78 the spark advance value 20 has been sampled and recorded. In step 80 shown in FIG. 3, the absolute difference between each two consecutively occurring spark timing values is calculated. Thus, using the chart of FIG. 4, the absolute difference spark timing values between consecutively occurring spark timing values 20 and 22 is 2 as is shown in the right column. The absolute difference between 22 and 14 is 8 and so on. In step 82, all of the absolute spark timing difference values between consecutively occurring spark timing values are progressively added together to provide a sum total of all the absolute differences. This can be accomplished by progressively adding the values calculated in step 80 by, for example, progressively incrementing a counter in increments equal to a value calculated in step 80. Relating this to the chart of FIG. 4, all of the absolute difference values shown in the right column are added. In FIG. 4, the sum total of the absolute differences specified in the right column is 70. In step 84 of FIG. 3, the sum total 70 developed in step 82 is now displayed in the digital display 76 shown in FIG. 1.

The values set forth in the chart of FIG. 4 are not actual values obtained from a running engine but are given to explain the principal behind the method of detecting misfire according to this invention. In practicing the method of this invention, the data, like the data shown in FIG. 4, is obtained from an engine that is known not to be misfiring. This data is obtained with the engine operating in the idle mode. The data so obtained will result in a sum total of absolute differences (sum of right column in FIG. 4) that will be a numerical value that can be said to represent an index or reference value for an engine that is not misfiring.

When this reference numerical value has been obtained for an engine that is not misfiring, that numerical value can then be compared or checked against data obtained from other engines of the same type. If the sum total of absolute differences (right column of FIG. 4) obtained for a given engine that is being tested is less than or equal to the reference numerical value, the engine is not misfiring. On the other hand, if the sum total exceeds the reference numerical value, the engine is misfiring.

The reason that the numerical value of the sum total is higher when the engine is misfiring is because the idle speed control which varies spark advance is trying very hard to compensate for the misfire condition.

In regard to the number of samples of spark advance that are sampled, the number must be a calibratable number or, in other words, a number that is sufficient to detect misfire.

The following describes a modification that can be made to the program shown in FIG. 3. In this modification, each absolute difference values developed by step 80 is mathematically squared before being added. Thus, as this relates to the chart shown in FIG. 4, the absolute difference value of 2 would be squared and would therefore become 4. Difference value 8 would now become 64 and difference value 16 would become 256 and so on. The squared absolute difference values are all added together to provide a sum total.

In the use of the scan device 74, the technician can connect the device to the serial data terminal 70 and then read out the sum of absolute differences in spark timing advance that occurred on display 76. The number so read out or observed is then compared with the reference or index number for the particular engine being tested to determine whether or not misfire has occurred.

It should be appreciated by those skilled in the art that a device like device 74 could be permanently installed on a motor vehicle. In such an arrangement, the memory of microprocessor 72 could store an index or reference number indicative of an engine that is not misfiring. The sum total of absolute spark difference values would be compared against the reference value by an electronic comparator and if the sum total exceeded the reference value, a signal lamp would be turned on.

The embodiments of the invention in which an exclusive property or privilege is claimed are defined as follows:

1. The method of detecting a misfire condition in a spark ignited internal combustion engine where the idle speed of the engine is controlled by an idle speed control means that varies the spark timing advance developed by a spark timing control means for the ignition system of the engine to control engine idle speed, the steps comprising, operating said engine in an idle speed mode, while operating said engine in said idle speed mode causing said spark timing control means to vary said spark timing advance as a function of sensed engine speed to control idle engine speed, repeatedly sampling spark timing advance values developed by said spark timing control means for a predetermined number of data samples, determining the absolute difference in spark timing advance values between each pair of consecutively occurring data samples during the occurrence of said predetermined number of data samples, and adding together difference values that are related to each said absolute difference in spark timing advance values to provide a sum total of consecutively occurring difference values, the magnitude of said sum total being indicative of whether or not said engine is misfiring.

2. The method according to claim 1 where an engine misfire condition is indicated when said sum total exceeds a predetermined reference value.

3. The method according to claim 1 which further includes the step of displaying said sum total.

4. The method of detecting a misfiring condition in a spark ignited internal combustion engine where the idle speed of the engine is controlled by an idle speed control means that varies the spark timing advance developed by a spark timing control means for the ignition system of the engine to control engine idle speed, the steps comprising, operating said engine in an idle speed mode, while operating said engine in said idle speed mode causing said spark timing control means to vary said spark timing advance as a function of sensed engine speed to control idle engine speed, repeatedly sampling spark timing advance values developed by said spark timing control means for a predetermined number of data samples, determining the absolute difference in spark timing advance values between each pair of consecutively occurring data samples during the occurrence of said predetermined number of data samples, and adding together each said absolute difference in spark timing advance values to provide a sum total of consecutively occurring absolute difference spark timing values, the magnitude of said sum total being indicative of whether or not said engine is misfiring.

5. The method of detecting a misfiring condition in a spark ignited internal combustion engine where the idle speed of the engine is controlled by an idle speed control means that varies the spark timing advance developed by a spark timing control means for the ignition system of the engine to control engine idle speed, the steps comprising, operating said engine in an idle speed mode, while operating said engine in said idle speed mode causing said spark timing control means to vary said spark timing advance as a function of sensed engine speed to control idle engine speed, repeatedly sampling spark timing advance values developed by said spark timing control means for a predetermined number of data samples, determining a difference value that is equal to the absolute difference in spark timing advance values between each pair of consecutively occurring data samples during the occurrence of said predetermined number of data samples, mathematically squaring each said difference value, and adding together each said mathematically squared difference value to provide a sum total of mathematically squared difference values, the magnitude of said sum total being indicative of whether or not said engine is misfiring.

* * * * *